July 17, 1962 W. E. PERKINS 3,044,136
PIPE LINING APPARATUS
Filed Nov. 12, 1959 2 Sheets-Sheet 1
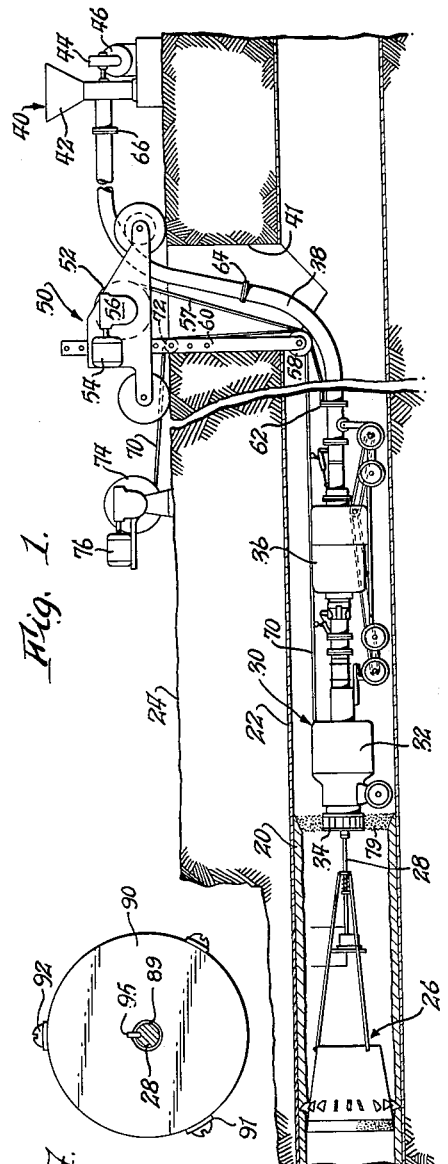
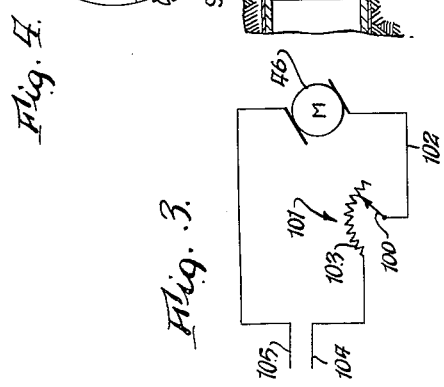
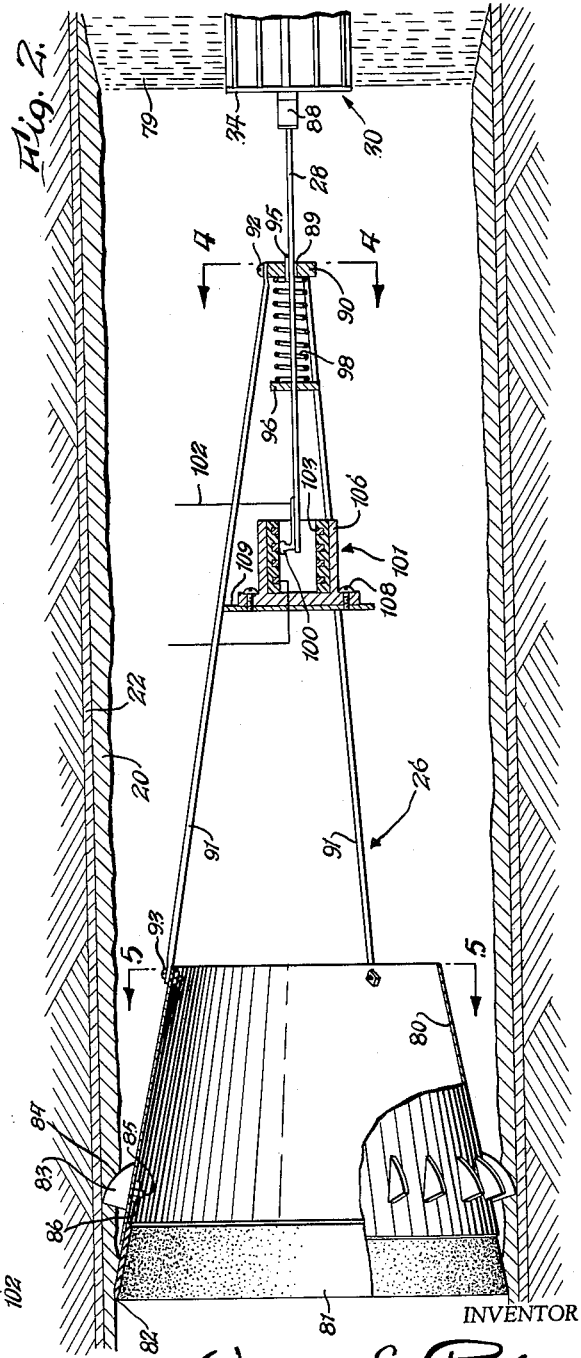
INVENTOR
Warren E. Perkins
BY Popp and Sommer
ATTORNEYS July 17, 1962 W. E. PERKINS 3,044,136
PIPE LINING APPARATUS
Filed Nov. 12, 1959 2 Sheets-Sheet 2
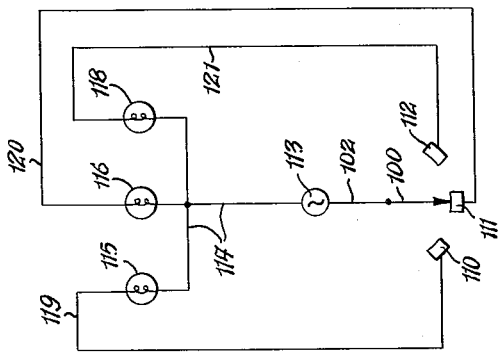
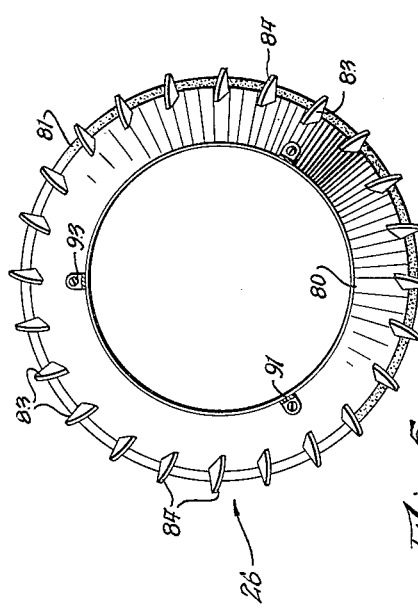
INVENTOR
Warren E. Perkins
BY Popp and Sommer
ATTORNEYS United States Patent Office 3,044,136
Patented July 17, 1962

3,044,136
PIPE LINING APPARATUS
Warren E. Perkins, Grand Island, N.Y., assignor to Perkins Pipe Linings, Inc., Grand Island, N.Y., a corporation of New York
Filed Nov. 12, 1959, Ser. No. 852,565
5 Claims. (Cl. 25—38)

This invention relates to apparatus for applying a protective coating of mortar or like material to the inner walls of pipe lines, conduits and the like, and more particularly to apparatus for providing such a lining to pipes of relatively small diameter in situ.

The present application is an improvement on the pipe lining apparatus disclosed in the Alfred J. Perkins Patent No. 2,758,352 dated August 14, 1956, to which reference is made for a more detailed description of certain parts of the coating material applying machine.

Pipe lining apparatus of the type disclosed in this patent and the present application includes a coating material applying machine which is propelled through the pipe while progressively applying coating material to the interior surface of the pipe by centrifugal force, the material being supplied from a source of material above ground through a hose drawn ahead of the machine. Connected to and trailing this coating material applying machine is a conical trowel the outside diameter of which conforms to the required inside diameter of lined pipe and which trowel serves to smooth out any surface irregularities in the lining.

An important object of the present invention is to provide such a conical trowel which not only serves to smooth out the inner surface of the lining but which also serves to center the trowel with respect to the pipe being lined so that the lining is of uniform thickness on all sides.

Another important object is to provide such a trowel which is so held in concentric relation to the pipe by means of pilot members which are arranged close to the effective surface of the trowel and are arranged to engage directly the bore of the pipe being lined, thereby to hold the trowel positively in such centered relation and to further insure uniform thickness of lining throughout the entire length of the pipe being lined.

Another object is to provide such a trowel centering means which is simple and inexpensive in construction, can be easily cleaned, and in which the wearing parts can easily be replaced.

Another important object of the present invention is to provide a pipe lining of uniform thickness through the regulation of the amount of mortar being centrifugally applied by the coating material applying machine. This is done in response to the thickness of the lining layer being applied and in the preferred form in response to the drag on or resistance encountered by the trowel in smoothing out the lining. Thus, if the coating applying machine is at any time applying an excessive amount of mortar, such excess is reflected in increased drag or resistance to the trowel in spreading out this mortar and this increased resistance is used to produce a signal for directly or indirectly reducing the speed of the motor controlling the rate of application of the lining material thereby to restore the desired conditions of applying exactly that amount of mortar required to produce a mortar lining of the specified thickness. It will be seen that the trowel thereby functions as a sensing device.

Another object is to provide such means for regulating the amount of mortar supplied in response to the resistance encountered by the trowel which are of simple and inexpensive construction, which will stand up under conditions of severe and constant use and which will serve accurately to provide a lining of uniform inside diameter throughout the length of the pipe.

Another object is to provide a simple and effective means for slowly rotating the trowelling structure as it is dragged along the pipe line.

Other objects and advantages will be apparent from the following description and drawings in which:

FIG. 1 is a vertical section through an underground pipe being lined with mortar in accordance with the present invention and illustrating the auxiliary equipment used in conjunction with the trowel structure and electrical control embodying the present invention.

FIG. 2 is a fragmentary enlarged view similar to FIG. 1 and in particular illustrating the trowel structure and electrical control of the present invention. The parts are illustrated in a condition where an excessive amount of mortar is being centrifugally applied to the inside of the pipe being lined.

FIG. 3 is a wiring diagram of the form of the invention shown in FIGS. 1 and 2.

FIGS. 4 and 5 are vertical transverse sections taken generally on the similarly numbered lines of FIG. 2.

FIG. 6 is a view similar to FIG. 2 and illustrating a modified form of the invention, this view also showing the position of the parts where the mortar is being deposited centrifugally at the desired rate.

FIG. 7 is a wiring diagram of the form of the invention illustrated in FIG. 6.

Referring more particularly to FIG. 1, a preferred embodiment of the pipe lining apparatus of the present invention is shown in use in applying a mortar lining 20 to a metal pipe 22 in place below the ground level 24. The apparatus includes a trowelling assembly 26 drawn, through a coupling such as a draw bar 28, by a pipe lining machine 30 in trailing relation thereto. The pipe lining machine 30 comprises a lining material distributing section or portion 32 having a centrifugally acting distributor head 34, and a machine propulsion section or portion 36 by which the machine is propelled through the pipe 22 being lined. The mortar or pipe lining or coating material is supplied to the pipe lining machine 30 through a flexible conduit or hose 38 from a remote source 40 above ground, access to the pipe being lined being had through a man-hole 41 or the like. As shown, the source of pipe lining or coating material includes a lining material supply tank or hopper 42 and a pump 44 driven by an electric motor 46.

The pipe lining machine 30 is self-propelled at an accurately determined speed for depositing a lining of a given thickness as will be more fully explained hereinafter, and to prevent disturbance of the travel of the pipe lining machine 30, the hose 38 is drawn ahead of the machine 30 by separate but coordinated propulsion means. To this end a winch device 50 is provided above ground having a reel 52 driven by an electric motor 54 through suitable gearing 56 for windlessing a draw cable 57 over a pulley 58 supported by the winch device 50 through an arm 60. The cable 57 is detachably connected to the hose 38 at one or more points such as at a coupling 62 at the outlet end of the hose and at spaced points (not shown) along the portion of the hose within the pipe 22, for drawing the hose through the pipe 22 ahead of the pipe lining machine by the operation of the winch. Preferably, the hose 38 may be broken into sections at intermediate couplings, one of which is shown at 64, so that as hose accumulates above ground with the progression of the pipe lining machine 30 through the pipe 22, successive sections of hose adjacent the pump 44 can be removed at a coupling 66 on the pump discharge outlet.

An electric cable 70 is provided for supplying power below ground to the electric motor means of the lining machine 30 as well as for accurately controlling circuits for the motors 46 and 54 above ground. This electric cable may pass over a companion sheave of the pulley 58 and over a second pulley 72 carried by the winch supported arm 60 to a reel 74 driven by an electric motor 76, this motor preferably being energized in response to slack in the cable 70 so that the cable 70 can be reeled in progressively as slack occurs therein with progressive travel of the lining machine 30 along the pipe 22.

The rotary distributor head 34, as well as the details of the lining material distributing section 32 and the propulsion section 36 of the pipe lining machine 30, are described in said Patent No. 2,758,552, the rotary distributor head 34 discharging streams 79 of mortar against the interior of the pipe 22 to build up the coating 20 therein, such centrifugal application producing a slightly pock-marked interior surface on the lining which the trowelling structure 26 removes. It will be seen that the thickness of the mortar coating is dependent upon the rate of supply of mortar to the rotary distributor head 34 or the rate of travel of the pipe lining machine 30 through the pipe 22. For present purposes it will be assumed that the rate of travel of the pipe lining machine 30 through the pipe 22 is maintained constant and that the rate of application of the mortar is controlled through regulation of the speed of the motor 46 for the pump 44 which delivers the mortar to the pipe lining machine 30.

The trowelling assembly 26 is shown as including a conical metal body 80 which can be open at its opposite ends, as shown. To the enlarged trailing end of this conical metal body is secured a conical rubber body 81 and which forms a flexible extension of the metal body 80. The conical rubber body 81 can be secured in any suitable manner, as by cement, and its trailing edge 82 is arranged to engage and smooth out or trowel the inner surface of the lining 20 to an exact circle.

An important feature of the invention resides in maintaining the conical rubber trowelling member 81 in exact concentricity with the pipe 22 being lined so that the lining 20 is trowelled to a uniform thickness around the interior of the pipe and for the full length thereof as the pipe lining apparatus moves along the pipe.

To this end, an annular series of trowel pilot members or fins 83 are mounted on the enlarged trailing end of the conical metal member 80 to project radially outwardly therefrom into engagement with the pipe 22. Each of these trowel pilot members is in the form of a fin or blade which cuts through the soft mortar lining 20 to so engage the inside of the pipe 22 and is preferably made of a hard steel so as to resist the abrasion of the mortar. Each fin or blade 83 is shown as having a curving edge 84 which cuts through the mortar and as having a stud bolt 85 extending through an opening in the conical metal member 80 to permit of securing the blade in position by means of a nut 86 screwing against the inside of the metal conical member 80.

In some operations, it is desirable to rotate the trowelling structure 26 about the axis of the pipe 22 and for this purpose the trowel pilot fins 83 can be set in helical relation to one another and to the axis of the pipe as best shown in FIG. 5. By this arrangement, the back pressure of the mortar 20 against these helically disposed blades 83 produce a force which slowly rotates the entire trowelling assembly 26 about its axis as it is drawn through the pipe by the draw bar 28.

For this purpose, the draw bar 28 is arranged concentric with the pipe 22 and is connected to the mortar applying machine 30 by means of a rotary coupling 88 which permits free rotation of the draw bar 28 about its axis. This draw bar extends through an opening 89 in a small end head 90 the periphery of which is shown as connected by three equally spaced rods 91 to the reduced end of the metal conical member 80. These rods can be secured in any suitable manner, such as by screws 92 connecting them at regularly spaced intervals around the draw head 90, and by bolts 93 similarly connecting them at regularly spaced intervals to the advancing end of the metal conical member 80.

A feature of the invention resides in determining the rate of application of mortar by the rotary distributor head 34 so that this rate can be increased when the drag or resistance to movement of the trowelling structure 26 drops below a predetermined value, and the rate of application of mortar by the rotary distributor head 34 can be decreased when the resistance encountered by the trowelling structure 26 to movement through the pipe increases above a predetermined value. By this means the mortar can be deposited by the rotary distributor head 34 at exactly the rate required to produce a uniform lining of exact thickness, this uniformity being further insured by the trowel pilot fins 83 which insure concentricity of the trowelling structure in relation to the pipe being lined. This adjustment of the rate of application of the motar can be automatic or can be effected manually in response to a signal.

For so varying the rate of mortar application in response to the resistance encountered by the trowelling structure, the draw bar 28 is movable longitudinally in the opening 89 of the draw head 90 but is compelled to turn therewith by means of a key 95. Intermediate the draw head 90 and conical trowelling members 80, 81, a head 96 is secured, as by welding, to the draw bar 28 and a helical compression spring 98 is interposed between this head 96 and the draw head 90.

In the form of the invention shown in FIGS. 1–5, the trailing end of the draw bar 28 is shown as carrying the movable electrical contact 100 of a rheostat 101 and which contact is shown as connected by a wire 102 with one side of the motor 46 which controls the rate of mortar application by the rotary distributor head 34 by controlling the pump 44 supplying mortar to this distributing head. This movable contact 100 traverses a fixed resistance 103 which is shown as connected to one side 104 of the main power line, the other side 105 of this main power line being shown as connected to the other side of the motor 46 which determines the rate of mortar application. The longitudinal movement of the draw bar 28 causes the movable contact 100 to move along the fixed resistance of the rheostat 101, and thereby adjust the voltage supply and speed of the motor 46 which controls the rate of mortar application by the rotary distributor head 34. The resistor 103 of the rheostat 101 can be of any suitable form and is shown as mounted in a cylindrical holder 106 secured by screws 108 to a plate or web 109 which connects with the rods 91.

In the operation of the pipe lining apparatus as shown in FIGS. 1–5, the mortar applying machine 30 is self-propelled and moves along inside the pipe 22 at a constant rate of speed and through the draw bar 28 draws the trowelling assembly 26 which trails the mortar applying machine. The rotary distributor head 34 is rotated about the axis of the pipe 22 and centrifugally discharges streams of mortar 79 to build up the lining 20 within the pipe 22. The rate of application of this mortar by the rotary distributing head 34 is under control of the electric motor 46 which, through the pump 44, controls the supply of mortar to this distributing head.

The lining is smoothed by contact with the trailing edge 82 of the rubber conical trowelling member 81, the diameter of this trowelling edge 82 conforming to the required inside diameter of the lined pipe. This trowelling edge 82 is maintained in exact concentricity with the pipe 22 by means of the pilot fins 83 which radiate from the trailing end of the metal conical member 80 which carries the rubber conical member 81. These pilot fins 83 engage the inside of the pipe 22 being lined so as to maintain the trowelling edge 82 in exact concentricity therewith so as to produce a uniform lining thickness throughout the entire inside diameter of the pipe 22 for the full pipe length thereof. The pilot fins 83 can also be set in helical relation to one another, as shown in FIG. 5, so as to impart a turning movement to the trowelling structure as it moves along the pipe 22, such turning being permitted by the rotary coupler 88. This turning movement is due to the pressure exerted by the soft mortar 20 against the helically disposed pilot fins 83.

If the mortar is being applied by the rotary distributor head 34 at too great a rate, as illustrated in FIG. 2, a lining 20 of excessive thickness is applied to the inside of the pipe 22. When this excessive thickness is encountered by the trailing edge 82 by the rubber conical trowelling element 81, the drag or resistance to movement of this rubber trowelling element along the pipe is increased. Such increased resistance is exerted against the draw head 90 and causes this draw head to move against the resistance of the helical compression spring 98 and toward the trailing end of the draw bar 28. This causes the movable contact 100 of the rheostat 101 to move forwardly, in relation to the direction of travel of the pipe lining apparatus and in relation to the fixed resistance 103 of the rheostat 101. This serves to cut increased resistance into the circuit of the motor 46 and thereby transmit a signal of reduced voltage to the motor 46 and reduce the speed of this motor and the rate of mortar supplied to the rotary distributing head 34 by the pump 44. With such reduction in rate of mortar application by the rotary head 34 the thickness of the lining 22 being applied is decreased. Accordingly when the trowel edge 82 of the rubber conical trowelling member 81 encounters this lining of reduced thickness, the resistance or drag against its forward movement decreases and pressure against the helical compression spring 98 is relieved so that the trowel structure moves forwardly, or toward the lining machine 30 with reference to the draw bar 28 and its movable contact 100 of the rheostat 101 is actuated to decrease the resistance in the circuit of the motor 46 controlling the rate of mortar application by the pump 44 so that a signal or current of increased voltage is transmitted to this motor to increase its speed and the amount of mortar supplied by the pump 44 to the rotary distributing head 34.

It will be seen that in this action the trowelling structure 26 is a sensing device transmitting signals or voltage changes to the motor 46 and having portions engaging the lining 20 at opposite sides thereof, and which portions are subjected to increased drag when the lining gets too thick.

The form of the invention shown in FIGS. 6 and 7 is illustrative of manual control of the rate of application of mortar to the inside of the pipe 22 in response to a visible or audible signal controlled by the sensing device or trowel structure as illustrated as the preferred form of the invention.

To provide such a signal, instead of resistor 103, the cylindrical holder 106 contains three electrical contact rings 110, 111, 112 which are engaged by the movable contact 100 at the end of the draw bar 28. The line 102 of this contact 100 connects with a source of power 113, the other side of which is connected by a common line 114 to three signals in the form of signal lights 115, 116, 118 the other sides of which are connected by lines 119, 120 and 121 with the contacts 110, 111 and 112, respectively. These signal lights are arranged above ground in a position to be seen by the operator of the equipment and the light 115 can be green, the light 116 might be white and the light 118 can be red.

In FIG. 6 the trowel is shown as working on a centrifugally applied layer 20 of exactly the desired thickness and hence the drag upon the rubber conical body 81 is such that the movable contact 100 is in engagement with the center contact ring 111 thereby to illuminate the white light 116. Accordingly, the operator notes that the apparatus is functioning properly to apply a layer of mortar 20 of the desired thickness.

If through some change in conditions the mortar applying or pipe lining machine 30 should start to discharge centrifugally an excessive amount of mortar against the inside of the pipe 22, the layer 20 will build up to excessive thickness resulting in an increased drag against the conical rubber trowelling member 81 thereby to compress the spring 98 and move the movable contact 100 out of engagement with the central contact ring 111 into engagement with the contact ring 112. Accordingly, the white light 116 is extinguished and the red light 118 is illuminated. When the operator sees this, he adjusts the speed of the motor 46 so as to slow down the pump 44 and hence reduce the supply of mortar to the pipe lining machine 30. Accordingly, the thickness of the coating 20 is reduced, this in turn reducing the resistance to the passage of the trowelling assembly 26 thereby permitting the helical compression spring 98 to return the movable contact 100 to engagement with the central contact ring 11. Accordingly, the red light 118 is extinguished and the white light 116 is again illuminated.

If the operator should over-compensate in this adjustment the layer of motar 20 will become too thin and this will result in a still further reduction in the drag upon or resistance movement of the trowelling structure 26. Accordingly, the helical compression spring 98 will move the contact 100 into engagement with the contact ring 110 thereby to extinguish the white light 116 and illuminate the green light 115. This green light apprises the operator that insufficient mortar is being applied and he adjusts the speed of motor 46 to increase the speed of the pump 44 and thereby increase the thickness of the layer 20 of motar being applied.

From the foregoing, it will be seen that the present invention provides means for maintaining a conical trowelling member in exact concentricity with the pipe being lined; means for slowly rotating this trowelling member as it progresses along the pipe; and means controlling the rate of motar in advance of the trowelling member so that the exact required amount of mortar can be accurately applied at all times to produce the lining of the specified uniform thickness.

What is claimed is:

1. In apparatus for lining a pipe line with mortar, a mortar applying machine adapted to move lengthwise through the pipe line and including motor driven means for centrifugally applying variable quantities of mortar against the inside of the pipe line, a trowel adapted to move through said pipe in trailing relation to said lining machine and having portions in pressure contact with opposite portions of said lining whereby increasing thickness of the lining applied by said mortar applying machine results in increased resistance to movement of said trowel through said pipe, and means responsive to the degree of said resistance and controlling said motor driven means to increase the rate of application of mortar when said resistance drops below a value and to decrease the rate of application of mortar when said resistance increases above a value.

2. In apparatus for lining a pipe line with mortar, a mortar applying machine adapted to move lengthwise through the pipe line and including electric motor driven means for centrifugally applying variable quantities of mortar against the inside of the pipe line, a conical trowel arranged in trailing relation to said lining machine with its external surface engaging the mortar so applied by said lining machine and trowelling it to the required inside diameter, and means connecting said mortar applying machine and trowel and including means responsive to the degree of drag of said trowel against said lining applied by said mortar applying machine and producing a signal controlling said motor driven means to increase the rate of application of mortar when said drag drops below a value and to decrease the rate of application of mortar when said resistance increases above a value.

3. In apparatus for lining a pipe line with mortar, a mortar applying machine adapted to move lengthwise through the pipe and including electric motor driven means for centrifugally applying variable quantities of mortar against the inside of the pipe line, a conical trowel arranged in trailing relation to said lining machine with its external surface engaging the mortar so applied by said lining machine and trowelling it to the required inside diameter, a coupling member attached to said mortar applying machine, a coupling member attached to said trowel, spring means connecting said coupling members, a rheostat in circuit with said electric motor driven means and having its resistor operatively connected with one coupling member and its movable contact operatively connected to the other coupling member to increase the rate of application of the mortar when the drag of said trowel against said lining drops below a value and to decrease the rate of mortar application when said drag increases above a value.

4. In apparatus for lining a pipe line with mortar, a mortar applying machine adapted to move lengthwise through the pipe and including electric motor driven means for centrifugally applying variable quantities of mortar against the inside of the pipe line, a conical trowel arranged in trailing relation to said lining machine with its external surface engaging the mortar so applied by said lining machine and trowelling it to the required inside diameter, a coupling member attached to said mortar applying machine, a coupling member attached to said trowel, spring means connecting said coupling members, a series of electrical contacts operatively connected with one coupling member, a signal means in series with each of said series of electrical contacts and a source of power, and a single electrical contact progressively in series with signal means and source of power and operatively connected with the other coupling member to successively traverse said series of electrical contacts in response to variations in the drag of said trowel against said lining.

5. A trowel adapted to move lengthwise through a pipe line to trowel a mortar lining therein to a predetermined inside diameter, comprising a conical body adapted to be drawn concentrically with its small end first through said pipe line to bring the mortar in said pipe lining into conformity with the trailing end of maximum outside diameter, and at least three pilot fins projecting radially outwardly at spaced intervals from the trailing end of said conical body through said mortar into engagement with the inside of said pipe line, thereby to insure concentricity of said trowelled lining with the pipe line, said fins also being helically disposed with reference to each other and the axis of said conical body to react against said mortar and rotate said conical body in response to its movement lengthwise through said pipe line.

References Cited in the file of this patent
UNITED STATES PATENTS

| | | |
|---|---|---|
| 2,095,888 | Perkins | Oct. 12, 1937 |
| 2,704,873 | Kirwon et al. | Mar. 29, 1955 |
| 2,711,000 | Matheny | June 21, 1955 |
| 2,839,026 | Matheny | June 17, 1958 |
| 2,924,867 | Perkins | Feb. 16, 1960 |